(12) United States Patent
Hanamoto

(10) Patent No.: US 7,690,471 B2
(45) Date of Patent: Apr. 6, 2010

(54) HYDRAULIC-DRIVE WORK VEHICLE

(75) Inventor: Takahiro Hanamoto, Akashi (JP)

(73) Assignee: Kobelco Cranes Co., Ltd., Tokyo (JP)

( * ) Notice: Subject to any disclaimer, the term of this patent is extended or adjusted under 35 U.S.C. 154(b) by 687 days.

(21) Appl. No.: 11/467,825

(22) Filed: Aug. 28, 2006

(65) Prior Publication Data
US 2007/0062741 A1    Mar. 22, 2007

(30) Foreign Application Priority Data
Sep. 20, 2005    (JP) .............................. 2005-272807

(51) Int. Cl.
*B60K 28/10* (2006.01)
(52) U.S. Cl. .......................... 180/282; 180/305; 60/490
(58) Field of Classification Search .................. 180/22, 180/24.06, 282, 285, 305, 307, 338; 280/5.504, 280/5.507, 5.51; 60/446, 448, 451, 490
See application file for complete search history.

(56) References Cited

U.S. PATENT DOCUMENTS

| | | | | | |
|---|---|---|---|---|---|
| 2,279,008 | A | * | 4/1942 | Nathan | 60/328 |
| 4,947,956 | A | * | 8/1990 | Henline | 180/256 |
| 5,775,453 | A | * | 7/1998 | Williams et al. | 180/197 |
| 5,973,463 | A | * | 10/1999 | Okuda et al. | 318/430 |
| 6,135,231 | A | * | 10/2000 | Reed | 180/308 |
| 6,732,828 | B1 | * | 5/2004 | Abend et al. | 180/242 |
| 6,845,837 | B2 | * | 1/2005 | Ohashi et al. | 180/235 |
| 6,896,088 | B2 | * | 5/2005 | Dahl et al. | 180/305 |
| 6,904,993 | B1 | * | 6/2005 | Rinck et al. | 180/244 |
| 7,044,257 | B2 | * | 5/2006 | Kempf et al. | 180/305 |
| 7,059,442 | B2 | * | 6/2006 | Wilks et al. | 180/242 |
| 7,082,759 | B1 | * | 8/2006 | Tsukamoto et al. | 60/456 |
| 7,240,489 | B2 | * | 7/2007 | Hofer | 60/490 |
| 7,273,124 | B2 | * | 9/2007 | Tatsuno et al. | 180/305 |
| 7,383,913 | B1 | * | 6/2008 | Tsukamoto et al. | 180/307 |
| 2003/0173133 | A1 | * | 9/2003 | Kempt et al. | 180/305 |

FOREIGN PATENT DOCUMENTS

JP    9-32045    2/1997

* cited by examiner

*Primary Examiner*—Paul N Dickson
*Assistant Examiner*—Laura Freedman
(74) *Attorney, Agent, or Firm*—Oblon, Spivak, McClelland, Maier & Neustadt, L.L.P.

(57) ABSTRACT

A hydraulic-drive work vehicle includes a plurality of variable capacity hydraulic motors which are rotated by receiving pressure oil from a variable capacity hydraulic pump. Wheels provided at two or more axles are rotated due to torques of the hydraulic motors. The work vehicle is provided with a traveling stabilizer, the traveling stabilizer including a traveling-state detector for detecting a traveling state of the vehicle, and a controller which receives a signal from the detector and varies a capacity of at least particular one of the plurality of hydraulic motors according to the traveling state of the vehicle.

7 Claims, 3 Drawing Sheets

HYDRAULIC-DRIVE WORK VEHICLE

BACKGROUND OF THE INVENTION

1. Field of the Invention

The present invention relates to a hydraulic-drive work vehicle provided with a traveling stabilizer.

2. Description of the Related Art

Drive types of work vehicles such as wheeled cranes having two or more axles include a mechanical-drive type and a hydraulic-drive type. The former type may be a configuration provided with a center differential gear (hereinafter, referred to as center differential) which is a differential for distributing driving force into, for instance, front and rear axles evenly, or at a predetermined rate. The latter type may be a configuration which rotates a plurality of wheels provided at two or more axles due to torques of a plurality of hydraulic motors by using pressure oil supplied from a hydraulic pump which is driven by an engine, for instance, as disclosed in Japanese Unexamined Patent Application Publication No. 9-32045. This type provides a differential function for distributing driving force into the wheels evenly, in a similar manner to the center differential.

Incidentally, since a wheel base of this work vehicle is short and a height of the center of gravity thereof is high, the work vehicle may have a less straight-traveling stability than a passenger vehicle or truck has. This may be addressed by (1) setting restoring force of steering to a large value, for instance, by increasing a kingpin inclination or a caster angle, which are involved in wheel alignment, (2) extending the wheel base, (3) increasing a size of tires, etc.

However, in the case of (1), steering force would be increased; causing swinging ability (turning ability) to be decreased. This may be addressed by providing a power steering; resulting in the necessity of a large power assist, which causes other problems that a cost of a device is increased and a space necessary for laying out the device is increased. In addition, in a case of a hydraulic power steering, if an amount of the power assist is increased even though steering force is small, abnormal vibration is likely to be generated.

Further, according to (2), the extension of the wheel base decreases ability to access a narrow space and also ability to turn in a small diameter. Besides, it is difficult to employ (2) in consideration of the law on dimensions of the vehicle. Further, (3) also involves problems in terms of dimensions such as a width and an overall height of the vehicle. Besides, there are common problems related to the law in terms of an increase in the weight, and related to low mileage.

Meanwhile, when a front-wheel-drive vehicle is compared with a rear-wheel-drive vehicle, as in a case of a passenger vehicle, the front-wheel-drive vehicle has difficulty in turning, thereby having characteristics of good straight-traveling stability and poor swinging ability. On the other hand, the rear-wheel-drive vehicle has easiness in turning, thereby having characteristics of good swinging ability and poor straight-traveling stability. The characteristics are correlated with gripping force of the tires, and may be applied to a case of the work vehicle having the two or more axles.

SUMMARY OF THE INVENTION

An object of the present invention is to provide a hydraulic-drive work vehicle provided with a traveling stabilizer which appropriately distributes driving force into a front axle and a rear axle by varying capacities of hydraulic motors corresponding to axles according to a traveling state for effectively increasing straight-traveling stability or swinging ability upon implementation.

Particularly, a hydraulic-drive work vehicle according to an aspect of the present invention includes: an engine; a variable capacity hydraulic pump which is driven by the engine; a plurality of variable capacity hydraulic motors which are rotated by receiving pressure oil from the hydraulic pump; wheels provided at a plurality of axles which are rotated due to torques of the hydraulic motors; and a traveling stabilizer. In addition, the traveling stabilizer has: a traveling-state detector for detecting a traveling state of the work vehicle; and a control means adapted to receive a signal from the traveling-state detector and to vary a capacity of at least particular one of the plurality of hydraulic motors according to the traveling state.

Preferably, the axles may include a front axle and a rear axle of the work vehicle.

With this configuration, the traveling state of the work vehicle is detected by the traveling-state detector, and the control means adapted to receive the signal from the detector varies the capacity of the particular hydraulic motor according to the traveling state of the work vehicle. For instance, when the traveling state is unstable, the capacity of the hydraulic motor corresponding to the front axle of the work vehicle is increased, and besides/or alternatively the capacity of the hydraulic motor corresponding to the rear axle of the work vehicle is decreased, so that the driving force transmitted to the wheels of the front axle of the work vehicle becomes larger than that of the rear axle of the work vehicle, thereby increasing the straight-traveling stability. On the other hand, when the traveling state is stable, the capacity of the hydraulic motor corresponding to the front axle of the vehicle is decreased and besides/or alternatively the capacity of the hydraulic motor corresponding to the rear axle of the vehicle is increased, so that the driving force transmitted to the wheels of the rear axle of the vehicle becomes larger than that of the front axle of the vehicle, thereby increasing the swinging ability.

Accordingly, since the capacity of the particular hydraulic motor of the plurality of variable capacity hydraulic motors is varied according to the traveling state of the vehicle and the distribution of the driving force transmitted to the wheels of the front axle and that of the rear axle is varied, thereby effectively increasing the straight-traveling stability or the swinging ability. In addition, the configuration of a hydraulic circuit may employ the known configuration, and it is not necessary to increase the dimensions of the vehicle, which are extremely advantageous for the implementation.

Preferably, the control means may have the following function. Particularly, the control means may be adapted to control so that the capacity of the hydraulic motor corresponding to the front axle of the vehicle is relatively increased to be higher than that corresponding to the rear axle of the vehicle when the traveling state of the vehicle is unstable. In this case, under the control of the control means, when the traveling state of the vehicle is unstable, the capacity of the hydraulic motor corresponding to the front axle of the vehicle is relatively increased to be higher than that corresponding to the rear axle of the vehicle, so that the driving force transmitted to the wheels of the front axle of the vehicle becomes larger than that of the rear axle of the vehicle. Accordingly, the straight-traveling stability can be effectively increased in the unstable traveling state.

Preferably, the control means may have the following function. Particularly, the control means may be adapted to control so that a capacity of the hydraulic motor corresponding to the rear axle of the vehicle is relatively increased to be higher than that corresponding to the front axle of the vehicle when the traveling state of the vehicle is stable. In this case, under the control of the control means, when the traveling state of the vehicle is stable, the capacity of the hydraulic motor corresponding to the rear axle of the vehicle is relatively increased to be higher than that corresponding to the front axle of the vehicle, so that the driving force transmitted to the wheels of the rear axle of the vehicle becomes larger than that of the front axle of the vehicle. Accordingly, the swinging ability can be effectively increased in the stable traveling state.

Preferably, the traveling-state detector may have the following configuration and the control means may have the following function.

Particularly, the traveling-state detector may be a vehicle speed sensor for detecting a vehicle speed of the vehicle as the traveling state of the vehicle; and the control means may be adapted to determine that the traveling state is unstable if the vehicle speed is equal to or greater than a first predetermined value and that the traveling state is stable if the vehicle speed is smaller than a second predetermined value which is smaller than the first predetermined value, and then the control means may be adapted to vary the capacity of the hydraulic motor based on the determination.

In this case, the vehicle speed is detected as the traveling state of the vehicle, so that the straight-traveling stability in high-speed traveling and the swinging ability in low-speed traveling can be increased together.

Preferably, the traveling-state detector may be a lateral acceleration sensor for detecting a lateral acceleration of the vehicle as the traveling state of the vehicle; and the control means may be adapted to determine that the traveling state is unstable if the lateral acceleration of the vehicle is equal to or greater than a predetermined value and a variation thereof is smaller than a predetermined value, and then the control means may be adapted to vary the capacity of the hydraulic motor based on the determination.

In this case, the lateral acceleration of the vehicle is detected as the traveling state of the vehicle, so that stability in ordinary turning can be increased.

Preferably, the traveling-state detector may be a steering angle sensor for detecting a steering angle of the vehicle as the traveling state of the vehicle; and the control means may be adapted to determine that the traveling state is stable if the steering angle of the vehicle is equal to or greater than a predetermined value and a variation thereof is equal to or greater than a predetermined value, and then the control means may be adapted to vary the capacity of the hydraulic motor based on the determination.

In this case, the steering angle of the vehicle is detected as the traveling state of the vehicle, so that the swinging ability can be increased when an operator operates a steering handle fully and quickly.

Preferably, the traveling-state detector may be a yaw rate sensor for detecting a yaw rate of the vehicle as the traveling state of the vehicle; and the control means may be adapted to determine that the traveling state is unstable if the yaw rate of the vehicle is equal to or greater than a first predetermined value and that the traveling state is stable if the yaw rate of the vehicle is smaller than a second predetermined value which is smaller than the first predetermined value, and then the control means may be adapted to vary the capacity of the hydraulic motor based on the determination.

In this case, the yaw rate of the vehicle is detected as the traveling state of the vehicle, so that the stability in a high yaw rate state and the swinging ability in a low yaw rate state can be increased together.

Preferably, the traveling-state detector may be a deceleration detector for detecting a deceleration of the vehicle as the traveling state of the vehicle; and the control means may be adapted to determine that the traveling state is unstable if the deceleration of the vehicle is equal to or greater than a predetermined value, and then the control means may be adapted to vary the capacity of the hydraulic motor based on the determination.

In this case, the deceleration of the vehicle is detected as the traveling state of the vehicle, so that the straight-traveling stability in decelerating can be increased.

DESCRIPTION OF THE PREFERRED EMBODIMENTS

Hereto, an embodiment, which is the best mode for implementing the present invention, will be described below with reference to the drawings.

Figure 1:
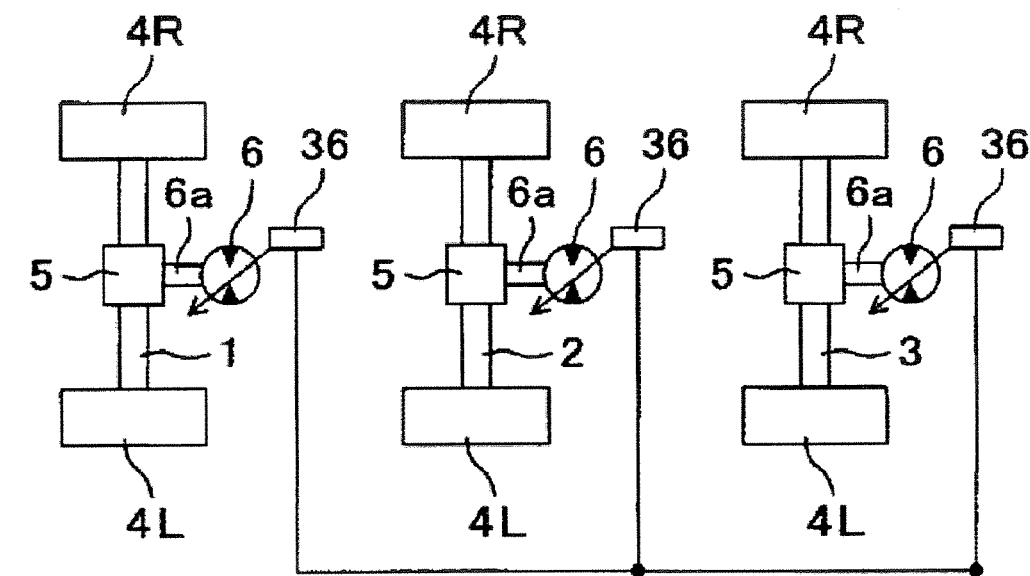
FIG. 1 is a general view of a configuration of a hydraulic-drive work vehicle according to an embodiment of the present invention.
Figure 1:
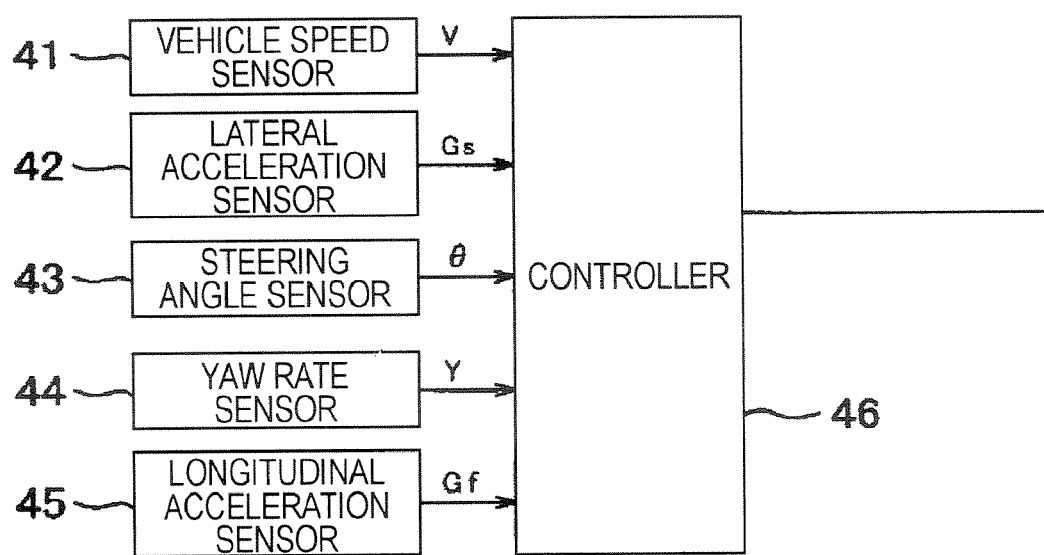

FIG. 1 shows a general configuration of a hydraulic-drive work vehicle according to an embodiment of the present invention. The work vehicle includes three axles 1, 2 and 3. In the following description, when the axles 1 to 3 are necessary to be distinguished, they are referred to as a first axle 1, a second axle 2, and a third axle 3 in the order starting from the front portion of the vehicle (left in the drawing).

Wheels 4L and 4R are provided on the left and right of each of the axles 1 to 3. A differential 5 is provided at each center portion of the axles 1 to 3. An output shaft 6a of a variable capacity hydraulic motor 6 is connected to the differential 5 in a manner capable of transmitting power. Three hydraulic motors 6 are provided to the axles 1 to 3, respectively. Torques of the hydraulic motors 6 are distributed into the left and right wheels 4L and 4R of the axles 1 to 3 via the differentials 5, so that the wheels 4L and 4R are rotated.

Figure 2:
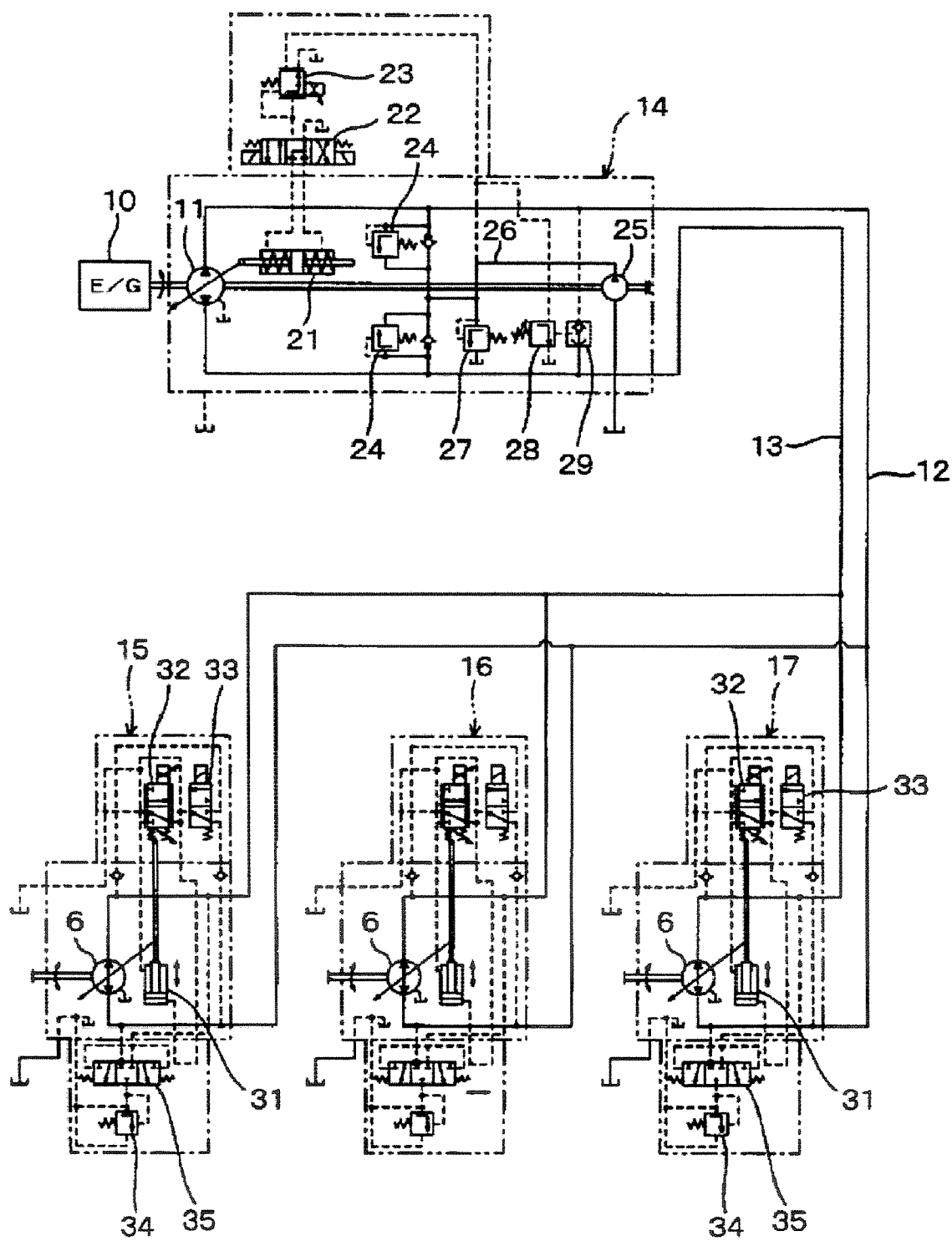
FIG. 2 is a hydraulic circuit diagram of the same work vehicle according to the same embodiment.

As shown in FIG. 2, the hydraulic motors 6 are connected to a variable capacity hydraulic pump 11, which is driven by an engine 10, with a forward-side hydraulic circuit 12 and a reverse-side hydraulic circuit 13 interposed therebetween, so that the hydraulic motors 6 are rotated by receiving pressure oil supplied from the hydraulic pump 11. The hydraulic pump 11 and hydraulic devices for controlling a capacity (discharging capacity) and a discharging direction of the hydraulic pump 11 form a pump-side unit 14, while the hydraulic motors 6 and hydraulic devices for controlling capacities of the hydraulic motors 6 form motor-side units 15, 16 and 17. The motor-side unit 15 corresponds to the first axle 1, the motor-side unit 16 corresponds to the second axle 2, and the motor-side unit 17 corresponds to the third axle 3.

The pump-side unit 14 includes the following components as the hydraulic devices in addition to the hydraulic pump 11. Particularly, the pump-side unit 14 includes a swash angle switching cylinder 21 for varying the capacity of the hydraulic pump 11; a solenoid valve 22 for switching the discharging direction of the hydraulic pump 11, that is, for switching the direction between the forward direction and the reverse direction; a proportional solenoid pressure-reducing valve 23 for controlling a pilot hydraulic pressure dedicated to drive the swash angle switching cylinder 21; a pair of relief valves 24 and 24 for controlling the highest hydraulic pressure of the forward-side hydraulic circuit 12 and that of the reverse-side hydraulic circuit 13, as main circuits; a charging pump 25; a relief valve 27 for controlling the highest hydraulic pressure of a charging circuit 26 which is connected to the charging pump 25; a cut-off valve 28 for decreasing the capacity of the hydraulic pump 11 when the pressure thereof reaches a predetermined pressure or higher; and a shuttle valve 29 for selecting a high pressure.

Each of the motor-side units 15 to 17 includes, as the hydraulic devices in addition to the hydraulic motor 6, a swash angle switching cylinder 31 for varying the capacity of each hydraulic motor 6; a proportional solenoid valve 32 for controlling the swash angle switching cylinder 31; a solenoid switching valve 33 for selecting a hydraulic pressure source to control the swash angle switching cylinder 31; a flashing valve 34 for appropriately discharging operation oil in the circuits; and a hydraulic pilot switching valve 35 for activating the flashing valve 34. Here, the capacity of each hydraulic motor 6 is varied by the proportional solenoid valve 32 via the swash angle switching cylinder 31. FIG. 1 shows that an electric controller 36 of the proportional solenoid valve 32 is configured to vary the capacity of each corresponding hydraulic motor 6.

Figure 3:
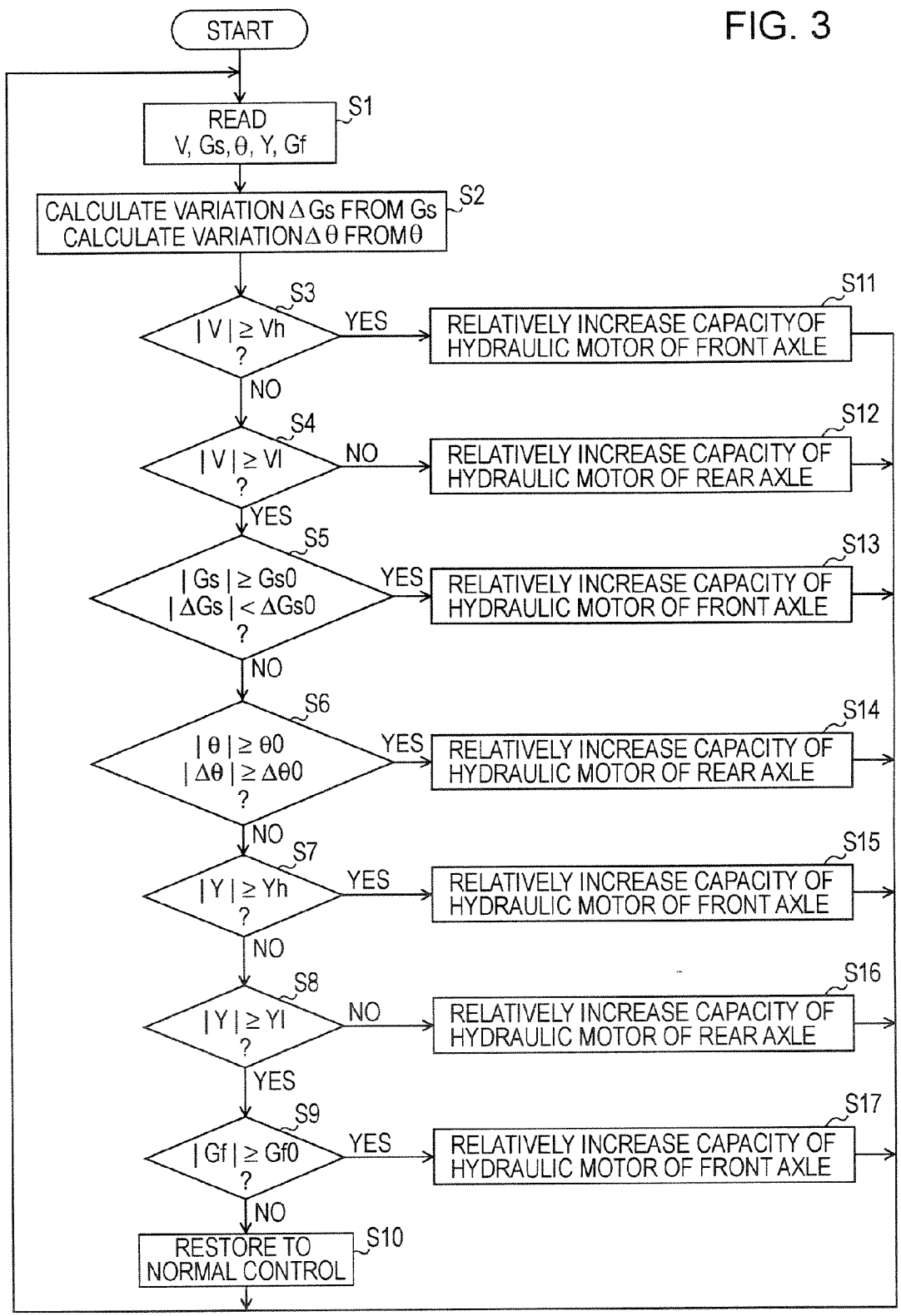
FIG. 3 is a flowchart showing a control operation of a controller.

As shown in FIG. 1, the work vehicle also includes, as traveling-state detectors for detecting the traveling state of the vehicle, a vehicle speed sensor 41 for detecting a traveling speed of the vehicle, that is, a vehicle speed V; a lateral acceleration sensor 42 for detecting a lateral acceleration Gs of the vehicle; a steering angle sensor 43 for detecting a steering angle θ of the vehicle; a yaw rate sensor 44 as an angular speed detector for detecting a yaw rate Y of the vehicle; and a longitudinal acceleration sensor 45 as a deceleration detector for detecting a longitudinal acceleration Gf including a deceleration of the vehicle. Note that the word "longitudinal" represents a forward-reverse direction, i.e., an advancement direction of the vehicle, and therefore, the above-stated "longitudinal acceleration sensor" represents "a sensor for measuring an acceleration in the advancement direction of the vehicle". Hereinafter, the longitudinal acceleration sensor 45 would be merely referred to as "acceleration sensor 45". In addition, the work vehicle includes a controller 46 as a control means adapted to receive signals sent from the various sensors 41 to 45. The controller 46 varies the capacities of the hydraulic motors 6 of the axles 1 to 3 via the electric controllers 36, according to the traveling state of the vehicle. This control is performed based on a flowchart shown in FIG. 3.

Herein, the yaw rate represents a speed at which a rotation angle of the vehicle in a turning direction of the vehicle is varied when the cornering vehicle is viewed from the above.

After the vehicle starts traveling, in step S1, the vehicle speed V from the vehicle speed sensor 41; the lateral acceleration Gs of the vehicle from the lateral acceleration sensor 42; the steering angle θ of the vehicle from the steering angle sensor 43; the yaw rate Y of the vehicle from the yaw rate sensor 44; and the longitudinal acceleration Gf of the vehicle from the acceleration sensor 45, are read as detection signals. Then, in step S2, a variation ΔGs is calculated from the lateral acceleration Gs which is detected currently and a lateral acceleration which is detected previously or a predetermined number of times earlier, and a variation Δθ is calculated from the steering angle θ which is detected currently and a steering angle which is detected previously or a predetermined number of times earlier.

Then, in step S3, it is determined whether or not the vehicle speed V is equal to or greater than a first predetermined value Vh (for instance, 50 km/h). If the determination is YES, it is determined that the traveling state of the vehicle is unstable in high-speed traveling in step S11, and then the capacity of the hydraulic motor 6 of the first axle 1, which is the front axle of the vehicle, is relatively increased to be higher than those of the second and third axles 2 and 3, which are the rear axles of the vehicle. For instance, the capacity of the hydraulic motor 6 of the first axle 1 is increased, and besides/or alternatively, the capacities of the hydraulic motors 6 of the second and third axles 2 and 3 are decreased. Then, the control returns to step S1.

On the other hand, if the determination is NO in step S3, it is determined whether or not the vehicle speed V is equal to or greater than a second predetermined value Vl (for instance, 20 km/h), which is smaller than the first predetermined value Vh. If the determination is NO, it is determined that the traveling state of the vehicle is stable in low-speed traveling in step S12, and then the capacities of the hydraulic motors 6 of the second and third axles 2 and 3, which are the rear axles of the vehicle, are relatively increased to be higher than that of the first axle 1, which is the front axle of the vehicle. For instance, the capacity of the hydraulic motor 6 of the first axle 1 is decreased, and besides/or alternatively, the capacities of the hydraulic motors 6 of the second and third axles 2 and 3 are increased. Then, the control returns to step S1.

If the determination is YES in step S4, that is, if the vehicle speed V is smaller than the first predetermined value Vh and is equal to or grater than the second predetermined value Vl (Vh>|V|≧Vl), it is further determined whether or not the lateral acceleration Gs of the vehicle is equal to or greater than a predetermined value Gs0 and the variation ΔGs is smaller than a predetermined value ΔGs0 in step S5. If the determination is YES, it is determined that the traveling state of the vehicle is unstable as in ordinary turning in step S13, and then the capacity of the hydraulic motor 6 of the first axle 1, which is the front axle of the vehicle, is relatively increased to be higher than those of the second and third axles 2 and 3, which are the rear axles of the vehicle. Then, the control returns to step S1.

If the determination is NO in step S5, it is further determined whether or not the steering angle θ of the vehicle is equal to or greater than a predetermined value θ0 and the variation Δθ is equal to or greater than a predetermined value Δθ0 in step S6. If the determination is YES, it is determined that the traveling state of the vehicle is stable in step S14, and then the capacities of the hydraulic motors 6 of the second and third axles 2 and 3, which are the rear axles of the vehicle, are relatively increased to be higher than that of the first axle 1, which is the front axle of the vehicle. Then, the control returns to step S1.

If the determination is NO in step S6, it is further determined whether or not the yaw rate Y of the vehicle is equal to or greater than a first predetermined value Yh in step S7. If the determination is YES, it is determined that the traveling state of the vehicle is unstable in step S15, and then the capacity of the hydraulic motor 6 of the first axle 1, which is the front axle of the vehicle, is relatively increased to be higher than those of the second and third axles 2 and 3, which are the rear axles of the vehicle. Then, the control returns to step S1.

If the determination is NO in step S7, it is further determined whether or not the yaw rate Y of the vehicle is equal to or greater than a second predetermined value Yl (<Yh), which is smaller than the first predetermined value Yh, in step S8. If the determination is NO, it is determined that the traveling state of the vehicle is stable in step S16, and then the capacities of the hydraulic motors 6 of the second and third axles 2 and 3, which are the rear axles of the vehicle, are relatively increased to be higher than that of the first axle 1, which is the front axle of the vehicle. Then, the control returns to step S1.

If the determination is YES in step S8, it is further determined whether or not the longitudinal acceleration Gf of the vehicle is equal to or greater than a predetermined value Gf0 in step S9. If the determination is YES, it is determined that the traveling state of the vehicle is unstable in step S17, and then the capacity of the hydraulic motor 6 of the first axle 1, which is the front axle of the vehicle, is relatively increased to be higher than those of the second and third axles 2 and 3, which are the rear axles of the vehicle. Then, the control returns to step S1.

On the other hand, if the determination is NO in step S9, the control is restored to normal control in step S10, then returns to step S1. To restore the control to the normal control, if the capacity of the hydraulic motor 6 is varied in any one of steps S11 to S17, the varied capacity is restored to the original state.

According to the control of the controller 46, the traveling state of the vehicle is determined whether it is unstable or stable, by referring the vehicle speed V, the lateral acceleration Gs of the vehicle and its variation ΔGs, the steering angle θ of the vehicle and its variation Δθ, the yaw rate Y of the vehicle, and the longitudinal acceleration Gf of the vehicle, which are parameters representing the traveling states of the vehicle. Then, the capacities of the three variable capacity hydraulic motors 6, 6, 6 corresponding to the axles 1 to 3 are varied corresponding to the parameters. Thus, the driving force transmitted to the wheels 4L and 4R can be independently varied for the axles 1, 2 and 3, so that the straight-traveling stability or the swinging ability can be increased according to the traveling state.

In other words, in the high-speed traveling, in which the vehicle speed V is equal to or greater than the first predetermined value Vh, it is determined that the traveling state is unstable, and then the capacity of the hydraulic motor 6 of the first axle 1, which is the front axle of the vehicle, is relatively increased to be higher than those of the second and third axles 2 and 3, which are the rear axles of the vehicle (step S11). Due to this, the driving force transmitted to the wheels 4L and 4R of the first axle 1 becomes larger than that of the second and third axles 2 and 3, thereby increasing the straight-traveling stability. On the other hand, in the low-speed traveling, in which the vehicle speed V is smaller than the second predetermined value Vl, which is smaller than the first predetermined value Vh, it is determined that the traveling state is stable, and then the capacities of the hydraulic motors 6 of the second and third axles 2 and 3, which are the rear axles of the vehicle, are relatively increased to be higher than that of the first axle 1, which is the front axle of the vehicle (step S12). Due to this, the driving force transmitted to the wheels 4L and 4R of the second and third axles 2 and 3 becomes larger than that of the first axle 1, thereby increasing the swinging ability.

In addition, in medium-speed traveling, in which the vehicle speed V is smaller than the first predetermined value Vh and is equal to or greater than the second predetermined value Vl, and in the ordinarily turning, in which the lateral acceleration Gs is equal to or greater than the predetermined value Gs0 and the variation ΔGs is smaller than the predetermined value ΔGs0, it is determined that the traveling state is unstable, and then the capacity of the hydraulic motor 6 of the first axle 1, which is the front axle of the vehicle, is relatively increased to be higher than those of the second and third axles 2 and 3, which are the rear axles of the vehicle (step S13). Due to this, the driving force transmitted to the wheels 4L and 4R of the first axle 1 becomes larger than that of the second and third axles 2 and 3, thereby increasing the straight-traveling stability.

Similarly, in the medium-speed traveling, in which the steering angle θ of the vehicle is equal to or greater than the predetermined value θ0 and the variation Δθ is equal to or greater than the predetermined value Δθ0, it is determined that the operator strongly desires to turn the direction of the vehicle, and therefore that the traveling state is stable. Thus, the capacities of the hydraulic motors 6 of the second and third axles 2 and 3, which are the rear axles of the vehicle, are relatively increased to be higher than that of the first axle 1, which is the front axle of the vehicle (step S14). Due to this, the driving force transmitted to the wheels 4L and 4R of the second and third axles 2 and 3 becomes larger than that of the first axle 1, thereby increasing the swinging ability.

Similarly, in the medium-speed traveling, and in a high yaw rate state, in which the yaw rate Y is equal to or greater than the first predetermined value Yh, it is determined that the traveling state is unstable, and then the capacity of the hydraulic motor 6 of the first axle 1, which is the front axle of the vehicle, is relatively increased to be higher than those of the second and third axles 2 and 3, which are the rear axles of the vehicle (step S15). Due to this, the driving force transmitted to the wheels 4L and 4R of the first axle 1 becomes larger than that of the second and third axles 2 and 3, thereby increasing the straight-traveling stability. On the other hand, in a low yaw rate state, in which the yaw rate Y is smaller than the second predetermined value Yl, which is smaller than the first predetermined value Yh, it is determined that the traveling state is stable, and then the capacities of the hydraulic motors 6 of the second and third axles 2 and 3, which are the rear axles of the vehicle, are relatively increased to be higher than that of the first axle 1, which is the front axle of the vehicle (step S16). Due to this, the driving force transmitted to the wheels 4L and 4R of the second and third axles 2 and 3 becomes larger than that of the first axle 1, thereby increasing the swinging ability.

Further, in the medium-speed traveling and in sudden decelerating, in which the deceleration, that is, the longitudinal acceleration Gf of the vehicle is equal to or greater than the predetermined value Gf0, it is determined that the traveling state is unstable, and then the capacity of the hydraulic motor 6 of the first axle 1, which is the front axle of the vehicle, is relatively increased to be higher than those of the second and third axles 2 and 3, which are the rear axles of the vehicle (step S17). Due to this, the driving force transmitted to the wheels 4L and 4R of the first axle 1 becomes larger than that of the second and third axles 2 and 3, thereby increasing the straight-traveling stability.

In addition, the hydraulic-drive work vehicle according to the above-described embodiment employs the known hydraulic circuit configuration, and it is not necessary to increase the dimensions of the vehicle, which are extremely advantageous for the implementation.

Note that the present invention is not limited to the above-described embodiment, and may include other various configurations. For instance, in the above-described embodiment, the hydraulic-drive work vehicle is so configured that the differential 5 is provided at each center portion of the axles 1 to 3, and the output shaft 6a of the variable capacity hydraulic motor 6 is connected to the differential 5, so that the left and right wheels 4L and 4R are rotated via the differential 5 due to the torque of the hydraulic motor 6. However, it is obvious that the present invention is not limited thereto, and the hydraulic-drive work vehicle may be so configured that the variable capacity hydraulic motors 6 are provided at the wheels 4L and 4R, respectively, so that the wheels 4L and 4R are rotated due to the torques of the hydraulic motors 6.

In addition, in the above-described embodiment, the hydraulic-drive work vehicle is configured to have the three axles and the six wheels. However, the present invention is not limited thereto, and may be widely applied to a hydraulic-drive work vehicle which has two or more axles with a plurality of wheels, and rotates the wheels by using the variable capacity hydraulic pump and the variable capacity hydraulic motor. In addition, it is obvious that the work vehicle may be so configured that the driving force is not transmitted to the front wheels which are steered by a steering handle or the like, and the driving force due to the hydraulic motor is transmitted to the wheels provided at the two or more axles except the front axle.

Further, according to the above-described embodiment, the acceleration sensor 45 is used as the deceleration detector for detecting the deceleration of the vehicle. However, it is obvious that the acceleration sensor 45 as the deceleration detector, which is provided at the present invention as the best mode, may be replaced with calculation of the longitudinal acceleration, particularly, the deceleration, by using a variation per hour of the vehicle speed detected by the vehicle speed sensor 41. In this case, the influence due to an inclination of a road can be eliminated.

In addition, while only the value of the yaw rate Y of the vehicle is used for determining the traveling state of the vehicle whether the unstable high yaw rate or the stable low yaw rate according to the above-described embodiment, the traveling state may be determined whether the traveling state is unstable or stable by the combination of the steering angle and the yaw rate of the vehicle according to the present invention.

Further, in the above-described embodiment, the controller 46 is configured to automatically vary the capacity of the variable capacity hydraulic motor 6 according to the traveling state of the vehicle. However, it is obvious that the present invention may be provided with a switching unit such as a switch for selecting the control to be executed or canceled according to the will of the operator.

Although the invention has been described with reference to the preferred embodiments in the attached figures, it is noted that equivalents may be employed and substitutions made herein without departing from the scope of the invention as recited in the claims.

What is claimed is:

1. A hydraulic-drive work vehicle comprising:
an engine;
a variable capacity hydraulic pump which is driven by the engine;
a plurality of axles arranged in a fore-aft direction of the vehicle, each of the axles being provided with a plurality of wheels;
a plurality of variable capacity hydraulic motors, each motor being connected and configured to drive the wheels of a respective one of the axles, wherein the motors are driven by pressure oil from the hydraulic pump; and
a traveling stabilizer, wherein the traveling stabilizer includes:
a traveling-state detector for detecting a traveling state of the work vehicle; and
a control means adapted to receive a signal from the traveling-state detector and to vary a capacity of at least one of the motors according to the detected traveling state of the work vehicle, whereby the driving force applied to all of the driven wheels of the respective axle driven by the at least one of the motors is varied according to the detected traveling state of the work vehicle,
wherein the axles include a front axle and a rear axle of the work vehicle, and wherein the control means is adapted to control a capacity of the hydraulic motor corresponding to the rear axle to be relatively increased to be higher than a capacity of the hydraulic motor corresponding to the front axle when the traveling state of the work vehicle is stable, so as to increase swinging ability.

2. The hydraulic-drive work vehicle according to claim 1, wherein the control means is adapted to control a capacity of the hydraulic motor corresponding to the front axle to be relatively increased to be higher than a capacity of the hydraulic motor corresponding to the rear axle when the traveling state of the work vehicle is unstable.

3. The hydraulic-drive work vehicle according to claim 2, wherein
the traveling-state detector is a vehicle speed sensor for detecting a vehicle speed of the work vehicle as the traveling state of the work vehicle; and
the control means is adapted to determine that the traveling state is unstable if the vehicle speed is equal to or greater than a first predetermined value and that the traveling state is stable if the vehicle speed is smaller than a second predetermined value which is smaller than the first predetermined value, and to vary the capacity of the at least one of the hydraulic motors based on the determination.

4. The hydraulic-drive work vehicle according to claim 2, wherein
the traveling-state detector is a lateral acceleration sensor for detecting a lateral acceleration of the work vehicle as the traveling state of the work vehicle; and
the control means is adapted to determine that the traveling state is unstable if the lateral acceleration of the work vehicle is equal to or greater than a predetermined value and a variation of the lateral acceleration of the work vehicle is smaller than a predetermined value, and to vary the capacity of the at least one of the hydraulic motors based on the determination.

5. The hydraulic-drive work vehicle according to claim 2, wherein
the traveling-state detector is a yaw rate sensor for detecting a yaw rate of the work vehicle as the traveling state of the work vehicle; and
the control means is adapted to determine that the traveling state is unstable if the yaw rate of the work vehicle is equal to or greater than a first predetermined value and that the traveling state is stable if the yaw rate of the work vehicle is smaller than a second predetermined value which is smaller than the first predetermined value, and to vary the capacity of the at least one of the hydraulic motors based on the determination.

6. The hydraulic-drive work vehicle according to claim 2, wherein
the traveling-state detector is a deceleration detector for detecting a deceleration of the work vehicle as the traveling state of the work vehicle; and
the control means is adapted to determine that the traveling state is unstable if the deceleration of the work vehicle is equal to or greater than a predetermined value, and to vary the capacity of the at least one of the hydraulic motors based on the determination.

7. The hydraulic-drive work vehicle according to claim 1, wherein the traveling-state detector is a steering angle sensor for detecting a steering angle of the work vehicle as the traveling state of the work vehicle; and the control means is adapted to determine that the traveling state is stable if the steering angle of the work vehicle is equal to or greater than a predetermined value and a variation of the steering angle of the work vehicle is equal to or greater than a predetermined value, and to vary the capacity of the at least one of the hydraulic motors based on the determination.

* * * * *